(No Model.)
P. ARNAUD & L. GAYETTE.
STEELYARD.
No. 280,779. Patented July 10, 1883.
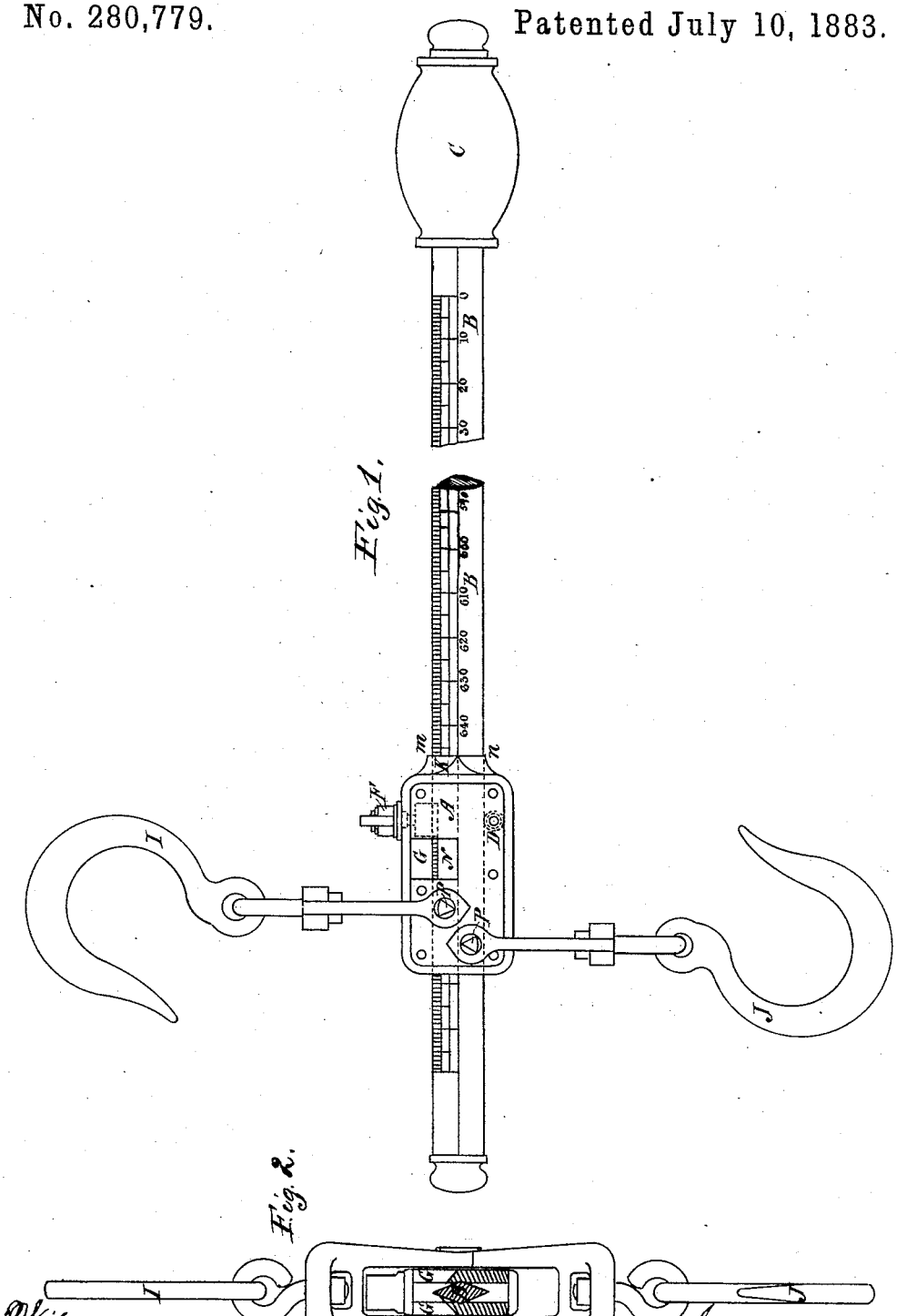

UNITED STATES PATENT OFFICE.

PIERRE ARNAUD AND LÉON GAYTTÉ, OF LA CIOTAT, FRANCE.

STEELYARD.

SPECIFICATION forming part of Letters Patent No. 280,779, dated July 10, 1883.

Application filed July 7, 1882. (No model.) Patented in France June 9, 1881, No. 143,964, and in England March 30, 1882, No. 1,549.

*To all whom it may concern:*

Be it known that we, PIERRE ARNAUD and LÉON GAYTTÉ, citizens of the Republic of France, residing at La Ciotat, France, have invented new and useful Improvements in Steelyards, (for which we have obtained a patent in France bearing date of June 9, 1881, No. 143,964, and have applied for Letters Patent in Great Britain, dated March 30, 1882, No. 1,549,) of which the following is a specification.

This instrument will be best understood by reference to the accompanying drawings, of which Figure 1 represents a side elevation, and Fig. 2 a vertical section upon line Y Z.

A is a box with reduced cheeks or sides, and carrying the knife-edges P. B is the beam or movable rod sliding in box A; C, counter-weight; D, a roller supporting the beam; F, a brake which keeps the beam in any given position; G, sight-holes in the cheeks, provided with a graduated scale, N. I and J are hooks; K, indicator showing the graduations on the beam, and fixed on the box A. The graduation begins with zero, whatever the full load may be, and is continued on the scale to the maximum load for which the steelyard is calculated. The zero-line is set off, so as to be in line with the edge $m\,n$ of the indicator at such time as the counter-weight, which is fixed, balances the part of the beam which extends at the other end of the box A when no weight is upon the hook J. If, starting from this initial position, the rod is caused to slide, the divisions marked on the instrument will pass under the edge $m\,n$, and thus the exact number of the principal units of weight is obtained. As to the subdivisions, they are obtained or seen by means of the scale N through sight-holes G in the cheeks or sides of the box. This scale is always in contact with the graduated part of the rod. Thus the indicator K will point out the exact number of whole units of weight, while the subdivisions thereof can be seen or obtained through said sight-holes. Thus the weight—say in kilograms and hectograms—is obtained by one operation.

By this construction not only is the starting-point always zero, but, moreover, the counter-weight is so attached to the rod as to prevent variation, and thus fraudulent substitution or modification is prevented. The cumbrousness and weight are also less than with older constructions. The manipulation is equally simple and easy and more exact, as in the ordinary ones the hook of the counter-weight becoming worn its thickness prevents the graduations being read, and there is uncertainty about the point of suspension of the load.

Having now described our invention, we wish it understood that we claim—

1. The graduated beam having a counter-weight at one end, in combination with the box A, carrying knife-edges P, to which hooks I J are connected, said box being provided with a roller, D, for supporting the beam, and a brake which holds said beam to any given position, substantially as set forth.

2. The box A, in combination with the beam and counter-weight, said box having a roller, D, upon which the beam is supported, and a brake, F, for holding said beam to any given position, substantially as set forth.

3. The beam B, provided with a counter-weight, C, at one end, and graduated from said counter-weight to the other end of said beam, in combination with box A, formed with reduced sides, having sight-holes G in said sides, said box being provided with knife-edges P on the outside, to which hooks I J are connected, substantially as set forth.

PIERRE ARNAUD.
LÉON GAYTTÉ.

Witnesses:
GARNIER MARIUS,
L. CENTRE.